Feb. 1, 1966     E. BEANLAND     3,232,972
METHOD FOR PRODUCING ORGANO-SILICATES
Filed Aug. 4, 1964
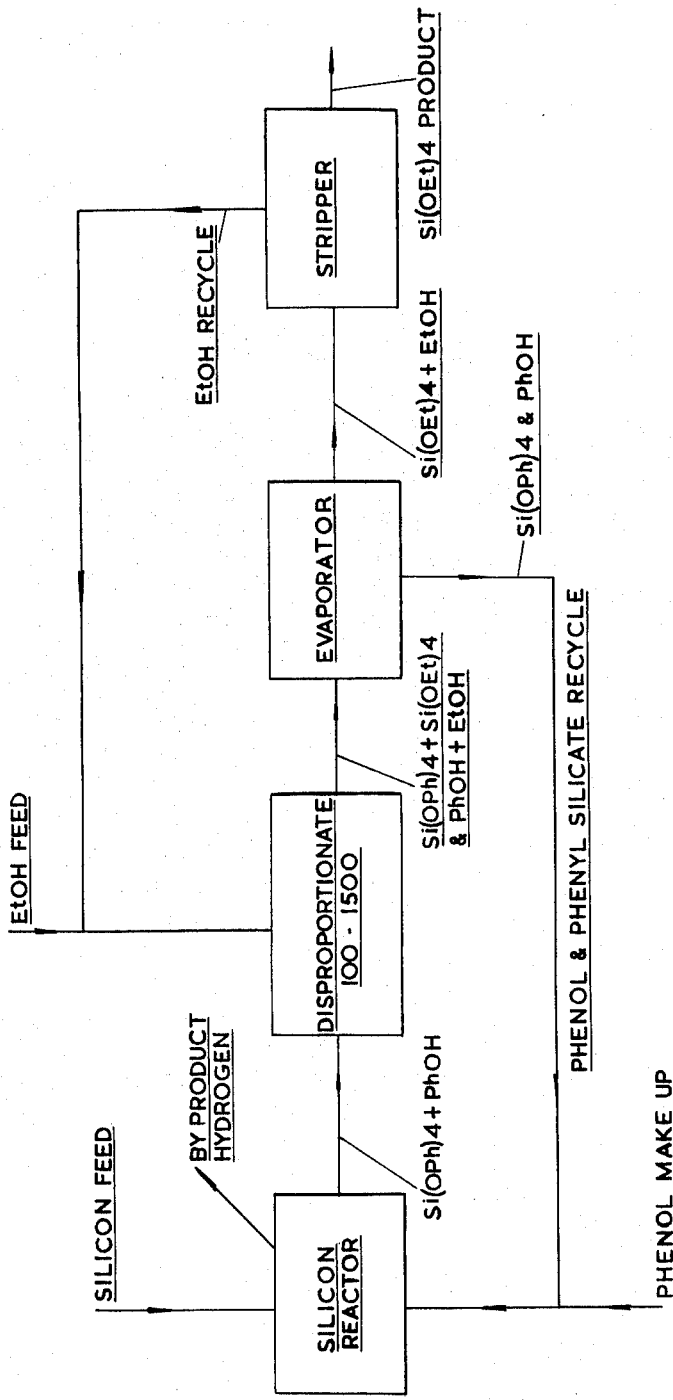

3,232,972
METHOD FOR PRODUCING ORGANO-SILICATES
Eric Beauland, London, England, assignor to Hygrotherm Engineering Limited, Manchester, England
Filed Aug. 4, 1964, Ser. No. 387,460
Claims priority, application Great Britain, June 1, 1960, 19,351/60; Feb. 24, 1961, 6,976/61
8 Claims. (Cl. 260—448.8)

The present application is a continuation-in-part of my application Serial No. 113,142 filed on May 29, 1961, and now abandoned.

This invention relates to the production of organo silicates, and specifically to the production of aryl silicates and of alkyl silicates. By this is meant a silicon compound incorporating an aryl or alkyl group linked to a silicon atom by way of an oxygen bridge, and there come into consideration not only the simple tetra aryl and alkyl silicates, but also mixed tetra aryl silicates where different aryl radicals are present, arylene disilicates, and alkyl aryl silicates as well as equilibrium mixtures formed by heating such compounds or mixtures of them at an elevated temperature.

The traditional method of making aryl silicates, which compounds are used on a substantial scale as heat transfer media, entails the reaction of silicon tetrachloride with an alcohol or a phenol, and involves the intrusion of chlorine. Where an alcohol is employed, the resulting alkyl silicate is converted to the aryl silicate by transesterification or phenolysis. The same intrusion of chlorine is generally involved when an alkyl aryl silicate is required. In this case, the corresponding organo silicon halide is normally prepared first and then reacted in place of the silicon tetrachloride. This results in a waste of chlorine and makes the whole process very expensive and also rather troublesome because of the noxious character of silicon tetrachloride and the corresponding alkyl derivatives. The direct production of aryl silicates had, however, not been considered feasible.

It has long been known that simple alcohols such as ethanol can be converted directly to the corresponding tetra-alkyl silicate by direct reaction with silicon in a silicon-copper alloy. This process is however scarcely feasible commercially. Rather low yields are obtained and, as described in the U.S. Patent No. 2,478,260 to Rowchow, if the copper is omitted, the yields are so meagre that the use of silicon without the copper catalyst is not practical. Analogously it has been suggested that phenol may be able to remove silicon from a copper-rich silicon-copper alloy.

I have now discovered that phenols, such as phenol itself and its homologues, such as the cresols and xylenols, having a sufficient heat stability, can be reacted directly with elemental silicon at temperatures above 280° C., to form excellent yields of the corresponding aryl silicate. Generally, temperatures in the range 300–420° C., will be employed, at atmospheric or super-atmospheric pressures as necessary: suitable pressures are between 100 and 300 p.s.i. Super-atmospheric pressures will in general be necessary when the phenolic reactant is employed in the liquid phase. At high temperatures, the reaction, which is reversible, will not go to completion.

The expression "elemental silicon" means silicon itself as distinct from silicon-based alloys. Thus the present invention does not use the prior art, copper-silicon alloys. It should be understood that the silicon does not need to be analytically pure, and a commercial grade of silicon, so-called ferro-silicon, may be employed. The traces of iron in ferro-silicon are however a mere impurity, contributing nothing to the process of the invention. The silicon (including ferro-silicon) may be used in granular or finely powdered form.

Where mixtures of phenols are employed, the corresponding mixed aryl silicates can be obtained directly and this represents a most favourable route to the silicate heat transfer fluids at present in use. A dihydric phenol such as resorcinol may be included. Where the corresponding alkyl derivatives are required, a minor proportion of the corresponding alkyl halide may be included with the phenolic reactant.

The reaction itself may be conducted by leading the phenol in the vapour phase over the silicon, or alternatively the molten phenol may be reacted with the silicon with or without the use of a high-boiling solvent. The presence of a solvent is advantageous in that it enables the vapour pressure of the phenolic reactant to be reduced, and it has been found that the end product, namely the aryl silicate, represents a particularly suitable solvent. By this use of the end product, the aryl silicates can be made continuously. The solvent may be a used heat transfer medium which has to be "re-conditioned" as a result of having undergone decomposition and/or polymerisation. The concentration of the phenol may vary over a wide range, the reaction speed increasing with increasing concentration.

If water is incorporated into the reaction mixture of the method of this invention, aryl silicates may be produced which are polymeric in character.

Where the aryl silicates are being produced batchwise, it is found especially convenient to use salt hydrates as a source of water. This particular method of supplying to a reaction at an elevated temperature is not new in itself and those skilled in the art will have no difficulty in selecting suitable hydrates having regard for the reaction temperatures and pressures. Where the reaction is to be conducted continuously, it is more convenient to introduce the water along with the reactants suitably by employing wet phenol instead of anhydrous phenol in the feed stock. In each case, it is important to control the amount of water present at any given time in order to minimise excessive local hydrolysis, and this may readily be achieved by the two techniques mentioned. The polymeric aryl silicates have application as a heat transfer fluid, hydraulic fluid and for filling certain types of temperature sensitive instruments, such as described in U.S. Patent Reissue No. 22,961.

*Example 1*

Silicon (98% Si, 0.5% Fe) crushed and sieved to 10–40 mesh size, weighing 910 grams, was charged to a ten litre, mild steel, reaction vessel with 1131 grams of tetra phenyl silicate and 782 grams of phenol. Air was replaced with nitrogen and the reactor pressurized to 60 p.s.i. and 120° C. The temperature was raised to 350° C., in 74 minutes by external resistance heaters and the pressure was controlled at 225 p.s.i., excess gas being vented through a meter to measure the volume evolved. Immediately the temperature reached 350° C. and gas was being evolved steadily, phenol was pumped into the vessel at 735 grams per hour. Hydrogen gas was evolved at 1.375 litres a minute (corrected to N.T.P.) for 220 minutes while the pumping was continued for 224 minutes. Pump and heaters were then switched off, and when the reactor contents had cooled to 120° C. the total volume of hydrogen (measured at N.T.P.) was 432 litres. The product removed from the reactor contained 3.2% free phenols and was slightly impure tetra phenyl silicate.

The use of tetra phenyl silicate initially is not a necessary part of the process as described in the above example, and other experiments have been made with silicon and phenol only being charged to the reactor.

Example 2

At the completion of an experiment producing tetra phenyl silicate the reactor contained 3 kilos of silicon (98% Si, 0.5% Fe) graded 10 mesh to dust, 1500 grams of tetra phenyl silicate and 60 grams of phenol. Nitrogen was used to replace the air and the vessel then pressurized to 200 p.s.i. at 105° C. and heated to 350° C. with the pressure control valve set to 205 p.s.i. A mixture of phenol (100 parts by weight) and resorcinol (15 parts by weight) was pumped in at 1442 grams per hour. At 350° C. hydrogen was evolved at 1.817 litres per minute (at N.T.P.). The pumping was increased to 2,200 grams per hour after 95 minutes pumping and continued for 40 minutes. The rate of gas evolution was 1.86 litres a minute during this time. Hydrogen evolution continued for a further 110 minutes. When the reactor was shut down, a total of 3260 grams of the phenol/resorcinol mixture had been pumped. The total product weighed 5000 grams and consisted of 20% by weight unreacted phenols, 80% by weight phenyl resorcinyl silicate.

The silicate, after filtration and removal of the free phenols, was a dark brown liquid, viscosity 57.7 centistokes at 25° C. The phenyl resorcinyl silicates have applications as heat transfer fluids (see British patent specification No. 848,472). A favoured material of this type produced from silicon tetra chloride would have a viscosity in the range 50–100 centistokes.

Example 3

At the completion of the experiment of Example 2, the reactor contained 1500 grams of a phenyl resorcinyl silicate containing approximately nine parts by weight of resorcinol for each one hundred parts by weight of phenol, the bulk of the product of the experiment of Example 2 having been removed from the reactor. A further experiment was then made, pumping phenol containing two parts by weight of water per one hundred parts by weight of phenol. The phenol/water mixture was pumped at 1442 grams per hour into the reactor at 370° C. and at a pressure of 210 p.s.i. Hydrogen evolution was at the rate of 2.3 litres per minute (corrected to N.T.P.) and the total volume evolved during the experiment in 240 minutes was 362 litres (at N.T.P.). The total weight of phenol and water pumped was 3480 grams. Product weighing 4640 grams was obtained from which 10% of unreacted phenol was removed by distillation under a vacuum of 10 mm. of Hg. The polymer silicate was a dark brown liquid having a viscosity of 41.7 centistokes at 25° C.

A further feature of the invention concerns the production of tetra alkyl silicates. As I have mentioned, it was already known that lower aliphatic alcohol such as methanol and ethanol would react with copper-promoted silicon to give the tetra-alkyl silicate. Transesterification with a phenol represented a conventional method of producing tetraphenyl and other tetra-aryl silicates. I have found my new, direct method of making tetra-aryl silicates is so efficient that this conventional method can be reversed, and the production of tetra-alkyl silicate accomplished much more advantageously if the silicon is first reacted with phenol or cresol by my new process, and then the resulting tetra-aryl silicate converted to tetra-alkyl silicate with liberation of the original phenol.

The transesterification process is conducted by effecting disproportionation between ethanol or other alkanol (having up to 10 carbon atoms) and tetraphenol silicate, in the presence or absence of a disproportionation catalyst, at an elevated temperature of for example 100–150° C. The resulting complex mixture, which will normally include some mixed phenyl alkyl esters as well as parent tetra phenyl silicate, unreacted alkanol, phenol and tetra-alkyl silicate, is passed to a still or evaporator from which a mixture of alkanol and tetra-alkyl silicate is removed as volatile fraction. This volatile fraction is further resolved into its constituents, namely the required tetra-alkyl silicate and alkanol; the alkanol is returned to the disproportionation stage and the liquid residue from the evaporator, consisting of phenol tetraphenyl silicate and in some cases also mixed phenyl alkyl silicates, may be supplemented by further phenol and passed over silicon for the production of further tetraphenyl silicate, or it may first be stripped or fractionated so that mixed alkyl phenyl silicates are removed and recycled to the disproportionation stage.

The disproportionation between the alkanol and the tetraphenyl silicate may be conducted under pressure and, as already mentioned, is conveniently carried out at 100–150° C. The evaporation of the alkanol and tetra-alkyl silicate, which are believed at least in some cases to form an azeotrope, is preferably conducted at a substantially lower temperature, say about 50° C., so that reversal of the disproportionation is inhibited. This evaporation may be conducted under reduced pressure.

If condensed alkyl silicate is required, water or wet alkanol may be incorporated in the flow from the evaporator to the stripper in which the alkanol is removed from the product, to give rise to a partial condensation.

The conversion of phenol to tetraphenyl silicate and the conversion of silicon to tetra ethyl silicate in accordance with this invention are both illustrated in the accompanying flow diagram. In this diagram, the various reactors are illustrated in block form and are adequately labelled so that the diagram is self explanatory. Silicon, suitably in the form of finely granulated ferro-silicon, is fed into the silicon reactor, into which is also fed fresh phenol. Additionally, recycled phenol and recycled phenyl silicate are fed into the silicon reactor, which is maintained at about 350° C. By-product hydrogen is removed from an upper part of the reactor, whilst the product tetraphenyl silicate with excess phenol is led off into a disproportionation reactor. This is also maintained under pressure at 100–150° C., and is fed with ethanol. Some of this is fresh ethanol and some is recycled ethanol. From the disproportionation reactor, the resulting complex mixture is fed into the evaporator at a still lower temperature, where it is subjected to reduced pressure. The temperature is maintained at about 50° C. Product tetra ethyl silicate and excess ethanol are fed into a stripper in which the ethanol is distilled or stripped from the tetra ethyl silicate product. The stripped ethanol is recycled to the disproportionation reactor. From the bottom of the evaporator the residual tetra phenyl silicate and phenol are recycled as already mentioned to the silicon reactor.

In general, the product from the disproportionation reactor will contain some mixed ethyl phenyl silicates in addition to the main recited ingredients and these will accompany the tetra phenyl silicate and phenol from the bottom of the evaporator. These could if desired simply be recycled to the silicon reactor without further treatment but, if preferred, an auxiliary stripper may be inserted into the phenol plus phenyl silicate recycle stream to remove these mixed silicates which may then be fed straight back to the disproportionation reactor.

I claim:

1. A method for the production of aryl silicates comprising reacting a phenol selected from the group consisting of phenol, cresols and xylenols in the molten state with a material selected from silicon and ferro-silicon, and in the presence of a high-boiling solvent, at a temperature above 300° C. and under super-atmospheric pressure.

2. A method as claimed in claim 1 wherein said high-boiling solvent is the product of the reaction, said aryl silicate.

3. A method as claimed in claim 2, operated with the continuous supply of said phenol and said material and continuous withdrawal of said product.

4. A method for the production of aryl silicates comprising reacting in the liquid phase at a temperature above 300° C. and under superatmospheric pressure, a phenol selected from the group consisting of phenol, cresols, and xylenols with a material selected from silicon and ferro-silicon and with water in the presence of a high boiling solvent, said water being present in an amount sufficient to result in the formation of aryl silicates which are polymeric in character.

5. A method for the production of aryl silicates comprising reacting a phenol selected from the group consisting of phenol, cresols and xylenols in the liquid phase at a temperature above 300° C. with a material selected from silicon and ferrosilicon in the presence of used aryl silicate heat transfer medium.

6. A process of producing a tetra-alkyl silicate wherein the alkyl radicals have from 1-10 carbon atoms which comprises reacting a phenol selected from the group consisting of phenol and cresol with a material selected from the group consisting of silicon and ferro-silicon, and a high boiling solvent at a temperature above 300° C. and under super-atmospheric pressure, removing any excess phenol from the resulting mixture, and disproportionating the separated tetra aryl silicate with an alkanol of 1-10 carbon atoms.

7. A process according to claim 6 which comprises the further steps of separating tetra-alkyl silicate and alkanol from phenolic ingredients of the product from the disproportionation and recycling at least phenol and unreacted tetra aryl silicate for further reaction with silicon.

8. A process of making tetra ethyl silicate which comprises the steps of reacting phenol with a material selected from the group consisting of silicon and ferro-silicon, and a high boiling solvent at a temperature above 300° C. and under super-atmospheric pressure, subjecting the product tetra phenyl silicate to disproportionation with ethanol in the liquid phase under pressure at a temperature above about 100° C., evaporating tetra ethyl silicate and unreacted ethanol from the disproportionation product at a temperature below the disproportionation temperature, stripping ethanol from the tetra ethyl silicate end product, recycling the stripped ethanol to the disproportionation reaction, and recycling part at least of the residue from evaporation of the disproportionation product for further reaction with the material selected from the group consisting of silicon and ferro-silicon.

References Cited by the Examiner
UNITED STATES PATENTS

| | | | |
|---|---|---|---|
| 2,389,931 | 11/1945 | Reed | 260—448.8 |
| 2,473,260 | 6/1949 | Rochow | 260—448.8 |
| 2,550,923 | 5/1951 | Hackford | 260—448.8 |
| 2,584,334 | 2/1952 | Da Fano | 260—448.8 |
| 2,650,204 | 8/1953 | Reynolds et al. | 260—448.8 |
| 2,820,806 | 1/1958 | Halsam | 260—448.8 |
| 3,072,700 | 1/1963 | De Wit | 260—448.8 |

TOBIAS E. LEVOW, *Primary Examiner.*